(12) United States Patent
Hwang (10) Patent No.: US 7,908,056 B2
(45) Date of Patent: Mar. 15, 2011

(54) STEER-BY-WIRE SYSTEM FOR AUTOMOBILES

(75) Inventor: Sung Wook Hwang, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 703 days.

(21) Appl. No.: 11/943,416

(22) Filed: Nov. 20, 2007

(65) Prior Publication Data

US 2009/0024281 A1 Jan. 22, 2009

(30) Foreign Application Priority Data

Jul. 18, 2007 (KR) .................. 10-2007-0071758

(51) Int. Cl.
*A01B 69/00* (2006.01)
(52) U.S. Cl. ......................................... 701/41
(58) Field of Classification Search ............. 701/41, 701/42; 180/6.2, 6.28, 406, 407, 408, 410, 180/422, 443
See application file for complete search history.

(56) References Cited

U.S. PATENT DOCUMENTS

| 6,082,482 | A  | * | 7/2000 | Kato et al. ................ 180/402 |
| 6,570,352 | B2 | * | 5/2003 | Hara et al. ................ 318/432 |
| 7,703,561 | B2 | * | 4/2010 | Miyajima et al. ........... 180/6.24 |

* cited by examiner

*Primary Examiner* — Kim T Nguyen
(74) *Attorney, Agent, or Firm* — Morgan, Lewis & Bockius LLP (57) ABSTRACT

Disclosed herein is a steer-by-wire system for automobiles. The steer-by-wire system includes a steering control unit and a signal input unit. The central control unit includes a reaction force generation unit, a damping force generation unit. The reaction force generation unit generates steering reaction force or restoring force, acting in the reverse direction to that of a steering torque. The damping force generation unit generates damping force, acting in the reverse direction to the steering reaction force or the restoring force (in the same direction as the steering torque). Furthermore, the central control unit generates a current control signal, which is applied to a steering feel generation motor, by combining the resulting values determined by the reaction force generation unit and the damping force generation unit a vehicle velocity signal in response to a steering angle signal, a steering torque signal and a steering angular velocity signal.

10 Claims, 7 Drawing Sheets

STEER-BY-WIRE SYSTEM FOR AUTOMOBILES

CROSS-REFERENCE TO RELATED APPLICATIONS

This application claims priority to Korean Application No. 10-2007-0071758, filed on Jul. 18, 2007, the disclosure of which is incorporated herein by reference.

BACKGROUND OF THE INVENTION

1. Field of the Invention

The present invention relates generally to a steer-by-wire system for automobiles, in which control logic, which can generate damping force acting in the reverse direction to that of steering reaction force, correct a difference between the left and right frictional forces of a rack motor, and adjust a steering feel according to road conditions, is additionally provided, thus more precisely controlling steering reaction force (or restoring force), with the result that the steering feel can be improved.

2. Description of the Related Art

Conventionally, a hydraulic system has been chiefly used as a power steering system. Such a hydraulic power steering system is configured such that a gear box, in which a pinion, connected on a steering column side, and a rack, connected on a vehicle wheel side via tie rods, are provided and are engaged with each other, is connected with an oil reservoir through a plurality of hoses so as to function as a power cylinder, and oil is supplied to both chambers of the gear box by an oil pump according to the direction in which a steering wheel is turned, and thus steering assistance force is generated.

However, the above-described hydraulic system is complicated because it is constructed using complicated hydraulic lines, that is, because the oil reservoir, the oil pump, the gear box, and the plurality of hoses for connecting them must be provided. Furthermore, in the case of a hybrid vehicle using a small-displacement engine, operating an oil pump using an engine is not preferred in the point of view of the rate of fuel consumption. For this reason, a power steering system that is different from the hydraulic power steering system is required.

A steer-by-wire system, which has been developed to solve the problems with the above-described hydraulic power steering system, is an electronic power steering system that transmits a signal, corresponding to the manipulation of a steering wheel, to vehicle wheels under the electronic control of a steering motor, without requiring any mechanical connection with a steering device.

Although the steer-by-wire system is expected to be the next generation power steering system due to its advantages that the construction thereof is simple because a small number of mechanical devices is used and that the fuel consumption rate is decreased, the steer-by-wire system is problematic in that, unlike an automobile (hereinafter referred to as an "actually used vehicle") that employs the hydraulic system, it does not provide a smooth steering feel, because a digital control method using a steering motor, rather than an analog control method, such as that of the conventional hydraulic system, is used.

In order to solve this problem, a design has been devised such that a reaction force motor is mounted in the column portion of a steering wheel, so that appropriate steering reaction and restoring forces are generated while a driver manipulates the steering wheel, therefore a steering feel similar to that of an actually used vehicle can be achieved. However, the existing steering-by-wire system is problematic in that the steering feel is still different from that of the actually used vehicle because the control logic of the existing steering-by-wire system is designed to focus only on the generation of steering reaction force and restoring force.

The problem with the steering feel attributable to the conventional steer-by-wire system is described in detail. When the steering wheel is restored, overshoot occurs, and thus the on-center feel is decreased and a steering reaction force is excessively generated in proportion to the steering angle, with the result that excessive steering effort is necessary. Furthermore, since steering angular velocity is not considered, catch-up occurs when rapid steering is performed, and the steering feel is decreased due to the difference between left and right motor torques, attributable to the frictional force of a steering column and the inertia of the steering motor.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and provides a steer-by-wire system, in which control logic, which can more precisely control the generation of steering reaction force and restoring force, generate an appropriate damping force acting in the reverse direction to that of the steering reaction force and the restoring force, depending on the steering torque of a steering wheel, correct a difference between left and right motor torques, and adjust the steering feel according to road conditions, is additionally provided, thus minimizing the difference in steering feel from the actually used vehicle.

The present invention provides a steer-by-wire system for automobiles, including a steering control unit comprising a steering wheel; a steering feel generation motor mounted in the steering control unit; a central control unit for outputting a steering control signal, and a current control signal, which is applied to the steering feel generation motor, according to the motion of the steering wheel; a steering mechanism unit comprising a rack motor for operating vehicle wheels in response to the steering control signal received from the central control unit; and a signal input unit comprising a vehicle velocity sensor, a steering angle sensor, a torque sensor, and a steering angular velocity sensor, and used to input a sensing signal, which is necessary for the central control unit to control the steering feel generation motor; wherein the central control unit receives a vehicle velocity signal, a steering angle signal, a steering torque signal and a steering angular velocity signal from the signal input unit, comprises a reaction force generation unit for generating steering reaction force or restoring force, acting in the reverse direction to that of a steering torque, and a damping force generation unit for generating damping force, acting in the reverse direction to the steering reaction force or the restoring force (in the identical direction to the steering torque), and generates a current control signal, which is applied to the steering feel generation motor, by combining the resulting values determined by the reaction force generation unit and the damping force generation unit.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings, which are given by way of illustration only, and thus are not limitative of the present invention, and wherein.

However, it should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
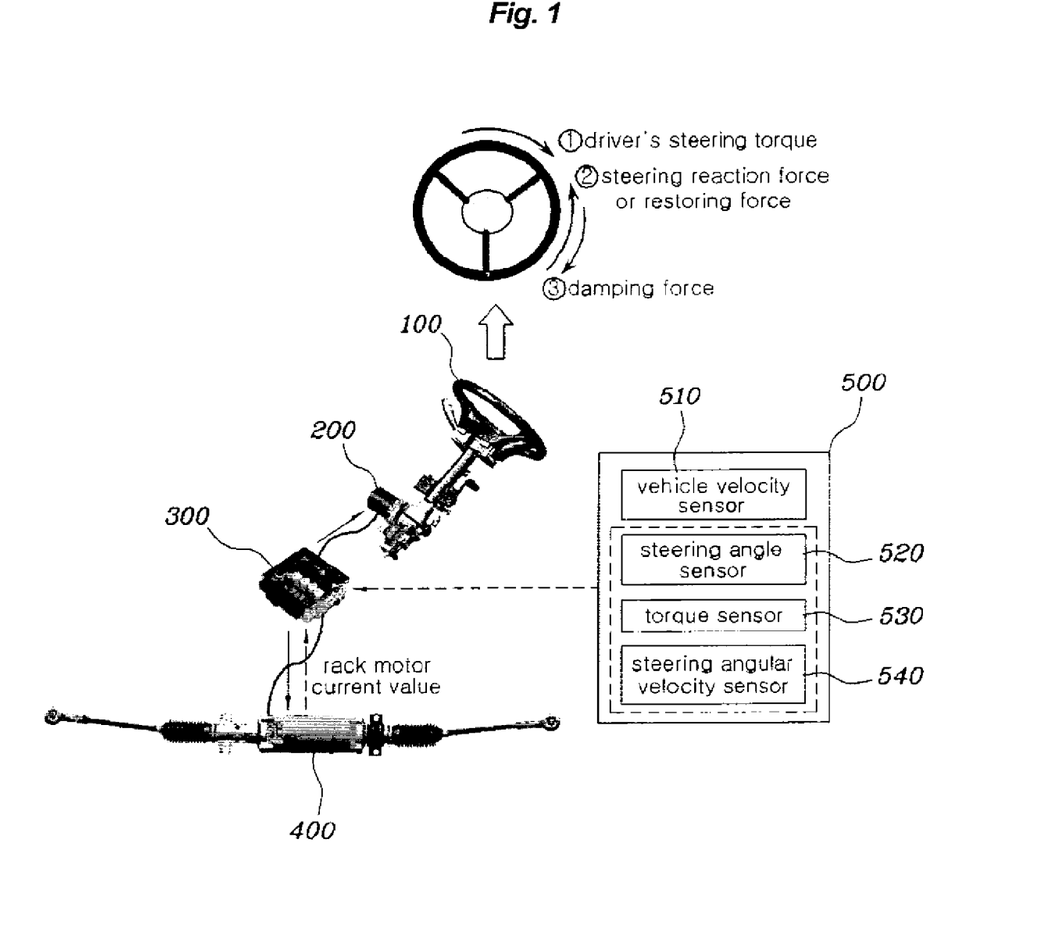
FIG. 1 is a diagram showing the overall construction of a steer-by-wire system according to the present invention.

The basic construction of a steer-by-wire system for automobiles according to the present invention is described with reference to FIG. 1 below.

The steer-by-wire system is a next generation steering device, and is configured such that a steering control unit 100, which is coupled with a steering wheel, and a steering mechanism unit 400, which is provided with a rack motor and a gear box, are independently separated from each other without directly connecting them using mechanical coupling elements, such as universal joints, and a central control unit 300 operates the rack motor of the steering mechanism unit 400 by outputting a necessary steering control signal according to the motion of the steering wheel, and thus vehicle wheels are controlled.

According to the steer-by wire system of the present invention, the central control unit 300 receives a current vehicle velocity signal, a steering angle signal, a steering torque signal, a steering angular velocity signal from a signal input unit 500, including a vehicle velocity sensor 510, which is mounted on a vehicle, a steering angle sensor 520, a torque sensor 530 and a steering angular velocity sensor 540, which are mounted on the steering control unit 100, generates steering reaction force and restoring force, which act in the reverse direction to that of a driver's steering torque, and damping force, which acts in the reverse direction to that of the steering reaction and restoring forces (in the same direction as the steering torque), and applies a final current value control signal, which is generated by combining the generated forces, to a steering feel generation motor 200 mounted in the steering control unit 100, thus enabling the driver to experience a steering feel similar to that of an actually used vehicle.

In order to create a steering feel, the conventional steer-by-wire system uses only control logic that is designed such that the central control unit 300 merely receives the vehicle velocity signal, the steering torque signal and the steering angle signal and generates only the steering reaction and restoring forces.

In contrast, the steer-by-wire system of the present invention includes control logic that is configured such that the central control unit 300 additionally receives the steering angular velocity signal and more precisely controls the steering reaction force and the restoring force, and additionally generates a damping force that acts in the reverse direction to that of the steering reaction force and the restoring force. Furthermore, a final current value control signal, which is applied to the steering feel generation motor 200, is output through the combination of the steering reaction force, the restoring force and the damping force, so that the difference in steering feel from the actually used vehicle can be minimized.

Furthermore, the steer-by-wire system of the present invention corrects a difference between frictional forces in the left and right directions of the rack motor, and includes control logic that can adjust the steering feel according to road conditions, thus improving the steering feel.

Figure 2:
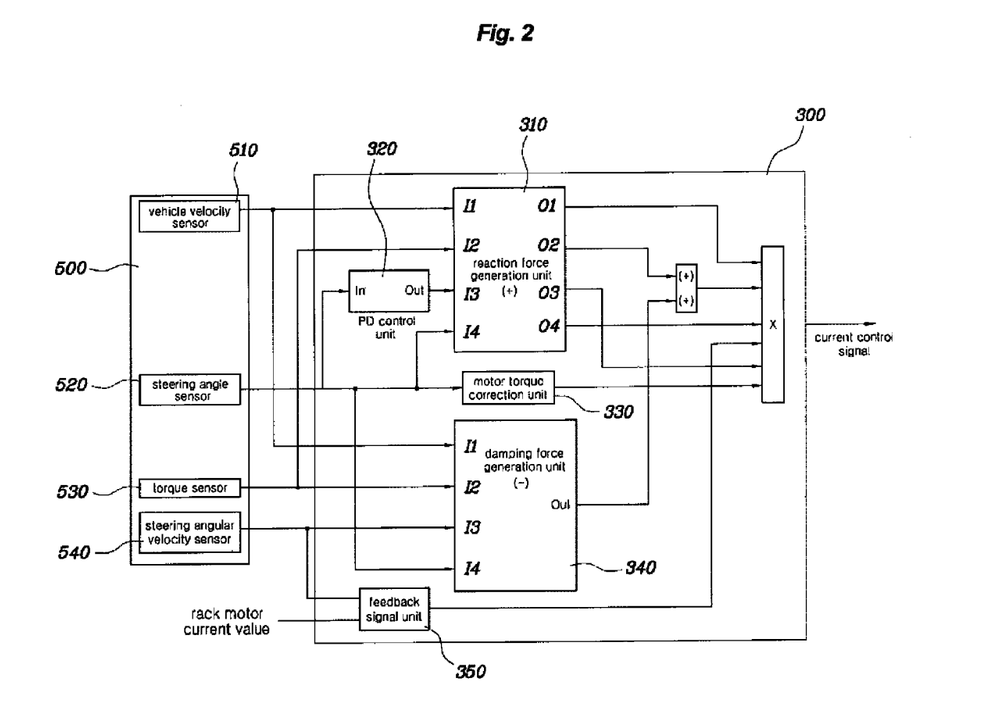
FIG. 2 is a block diagram showing principal parts of the steer-by-wire system according to the present invention.

An embodiment of a steer-by-wire system for automobiles according to the present invention is described in detail with reference to the accompanying drawings, that is, FIGS. 2 to 8. FIG. 2 shows a central control unit 300 and a signal input unit 500, which are principal parts of the steer-by-wire system according to the present invention.

Referring to FIG. 2, the signal input unit 500 includes a vehicle velocity sensor 510, a steering angle sensor 520, a torque sensor 530 and a steering angular velocity sensor 540. The vehicle velocity sensor 510 is mounted in a predetermined location in a vehicle and senses the driving velocity of the vehicle. The other sensors, that is, the steering angle sensor 520, the torque sensor 530 and the steering angular velocity sensor 540, are connected and mounted to the steering wheel, and respectively sense a steering angle, the driver's steering torque and a steering angular velocity, which are generated according to the motion of the steering wheel, and then input them to the central control unit 300.

The central control unit 300 includes a reaction force generation unit 310 for receiving a vehicle velocity signal, a steering angle signal, a steering torque signal from the signal input unit 500, and generating steering reaction force and restoring force [for convenience, indicated as (+)], acting in the reverse direction to that of the steering torque, and a damping force generation unit 340 for generating damping force [for convenience, indicated as (−)], acting in the reverse direction to that of the steering reaction force and the restoring force (in the same direction as the steering torque).

Furthermore, the central control unit 300 combines the resulting values, which are determined by the reaction force generation unit 310 and the damping force generation unit 340, and outputs a current control signal which is applied to the steering feel generation motor 200. As described above, in the present invention, the damping force, acting in the same direction as the driver's steering torque, is additionally provided, and the damping force and the steering reaction and restoring forces are appropriately combined, unlike the conventional technology, which uses only the steering reaction and restoring forces, acting in the reverse direction to that of the driver's steering torque, so that steering feel can be further improved. The detailed construction of the reaction force generation unit 310 and the damping force generation unit 340 will be described later with reference to FIGS. 4 and 5.

Figure 3:
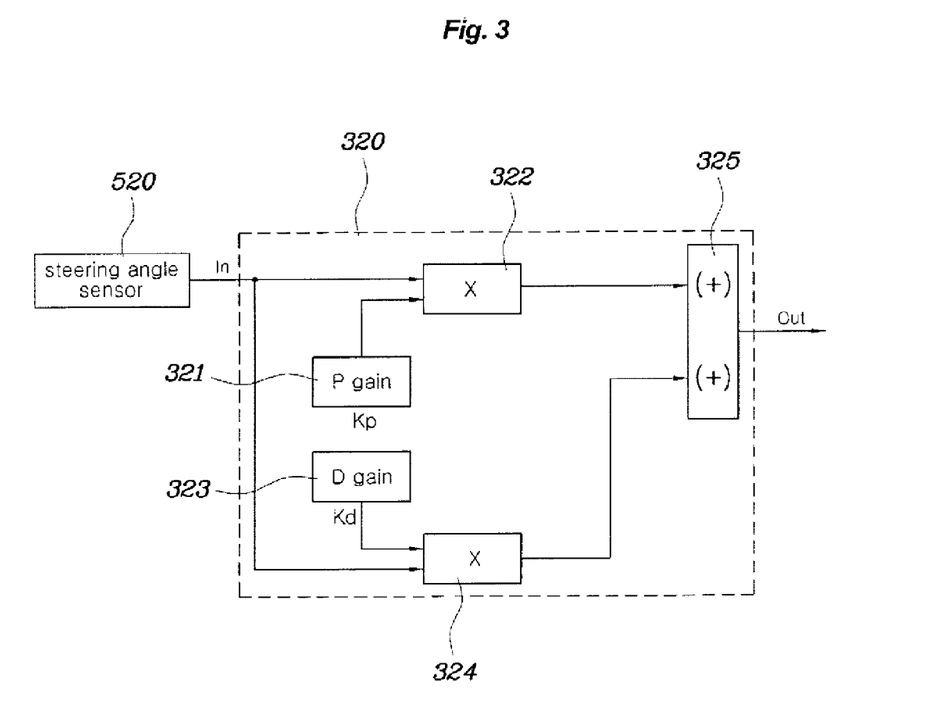
FIG. 3 is a block diagram showing the control logic of a PD controller according to the present invention.

In order to more precisely control the steering reaction force or the restoring force, the central control unit 300 further includes a Proportional-Derivative (PD) control unit 320 for receiving the steering angle signal, performing a proportional-derivative operation on the received steering angle signal, and then outputting the resulting value to the reaction force generation unit 310. That is, in the present invention, a PD control method is used to adjust the steering feel depending on the steering angle, as shown in FIG. 3.

In greater detail, the PD control unit 320 sets a steering angle signal, which is generated when the steering angle is 0 degrees, as a reference value, and handles the other steering angle signals as error values, and generates steering reaction force (or restoring force) using both an operational logic 322 for adding a P gain (Kp) 321 in proportion to the magnitude of each error value and an operational logic 324 for adding a D gain (Kd) 323 according to variation in the magnitude of each error value, while reducing the fluctuation of the steering reaction force (or restoring force). Accordingly, when the steering wheel is restored, overshoot attributable to excessive restoring force decreases, and thus the on-center feel at a neutral angle is improved.

Meanwhile, in order to adjust the steering feel according to the road conditions, the central control unit 300 may further include a feedback signal unit 350 for receiving the feedback of the current value of the rack motor, performing operation on the received current value of the rack motor and the steering angular velocity signal input from the steering angular velocity sensor 540, and outputting the resulting value. Furthermore, the central control unit 300 combines the value determined by the feedback signal unit 350 with the values determined by the reaction force generation unit 310 and the damping force generation unit 340, and thus outputs the current control signal which is applied to the steering feel generation motor 200.

The current value of the rack motor varies according to road conditions. When the surface of the road is rough, the current value of the rack motor increases because the resistance value of the road increases. In contrast, when the surface of the road is smooth, the current value of the rack motor decreases because the resistance value of the road decreases. Furthermore, the steering angular velocity varies according to the road conditions even when the driver applies the same force. In consideration of these points, the present invention feeds back the current value of the rack motor, and divides the current value into current values for respective sections (preferably first section: more than 15 amperes, second section: 10~14 amperes, third section: less than 10 amperes), performs operation on the current values with respect to the respective sections along with the steering angular velocity signal, and applies the resulting values for the respective sections to the increase and decrease of the steering reaction force, thus providing an optimal steering feel.

Meanwhile, a motor torque correction unit 330 for correcting the difference between frictional forces in the left and right directions of the rack motor using the steering angle signal received from the steering angle sensor 520 may be additionally provided. The details of the motor torque correction are described in conjunction with the technical construction of the reaction force generation unit 310 below.

Figure 4:
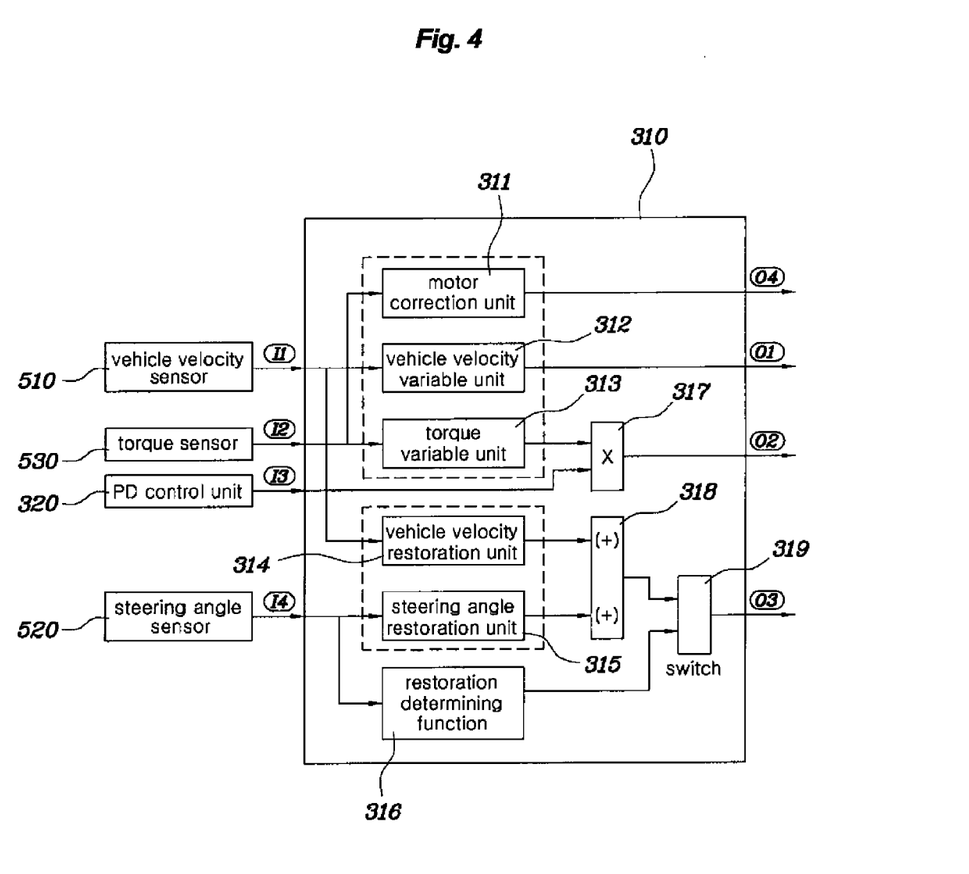
FIG. 4 is a block diagram showing the control logic of a reaction force generation unit according to the present invention.

FIG. 4 shows the detailed technical construction of the reaction force generation unit 310 according to the present invention.

The reaction force generation unit 310 is a control logic that performs operations necessary to generate the steering reaction force or the restoring force, which acts in the reverse direction to the driver's steering torque, and includes a steering reaction force generation block 350 and a restoring force generation block 360. For reference, in the present invention, the control logic refers to a software program, rather than a hardware construction.

In order to more precisely control the steering reaction force, the steering reaction force generation block 350 includes a motor correction unit 311 for determining the steering direction from the steering torque signal, determining the magnitude of the steering reaction force to correct the difference between frictional forces, attributable to the left and right rotation of the rack motor, based on the steering direction, a vehicle velocity variable unit 312 for determining the magnitude of the steering reaction force, which varies according to the vehicle velocity, from the vehicle velocity signal, and a torque variable unit 313 for determining the magnitude of the steering reaction force, which varies according to steering, from the steering torque signal.

The motor correction unit 311 performs the same function as the motor torque correction unit 330. Generally, a rack motor causes the difference between frictional forces in the left and right directions. Conventionally, when the driver rotates the steering wheel in the left and right directions, he or she can feel a slight difference because no correction for the difference is performed. However, the present invention generates the steering reaction force so as to prevent any difference between the left and right frictional forces from occurring using the motor correction unit 311 and the motor torque correction unit 330, thus minimizing the difference in steering feel from the actually used vehicle.

The vehicle velocity variable unit 312 determines the magnitude of the steering reaction force from the vehicle velocity signal received from the vehicle velocity sensor 510. For example, the steering wheel is made heavy by increasing the steering reaction force at the time of stoppage, reducing the steering reaction force as the vehicle velocity gradually increases, and increasing the steering reaction force again when the vehicle velocity is equal to or greater than a predetermined vehicle velocity.

When the steering wheel rotates by an amount equal to or greater than a predetermined angle (at the time of steering), the torque variable unit 313 makes the steering wheel difficult to turn by increasing the steering reaction force. In contrast, when the steering wheel rotates by an amount smaller than a predetermined angle (at the time of non-steering), the torque variable unit 313 adjusts the steering feel by decreasing the steering reaction force.

Furthermore, the central control unit 300 may be configured to output the current control signal, which is applied to the steering feel generation motor 200, through the operational logic 317 combining the resulting value received from the PD control unit 320 and the resulting value determined by the torque variable unit 313. For example, the influence caused by the damping force is increased by increasing the steering reaction force using the output value of the PD control unit 320 unchanged at the time of steering and decreasing the output value of the PD control unit 320 at the time of non-steering.

Meanwhile, in order to more precisely control the restoring force generated when the steering wheel is restored, the restoring force generation block 360 includes a vehicle velocity restoration unit 314 for determining the magnitude of the restoring force, which varies according to the vehicle velocity, from the vehicle velocity signal of the vehicle velocity sensor 510, and a steering angle restoration unit 315 for determining the magnitude of the restoring force, which varies according to the steering angle, from the steering angle signal of the steering angle sensor 520.

The steering feel is adjusted in such a way that the vehicle velocity restoration unit 314 increases the restoring force as the vehicle velocity increases, and the steering angle restoration unit 315 increases or decreases the left and right directions and the magnitude of the steering angle.

Meanwhile, the reaction force generation unit 310 may further include a restoration determining function 316 for determining whether the steering wheel is restored. The restoration determining function 316 determines whether the steering wheel is restored based on the direction and magnitude of the steering angle signal received from the steering angle sensor 520. The resulting values of the vehicle velocity restoration unit 314 and the steering angle restoration unit 315 are combined by an operational logic 318, and the resulting value is selectively output via a switch 319 in response to a signal from the restoration determining function 316.

Figure 5:
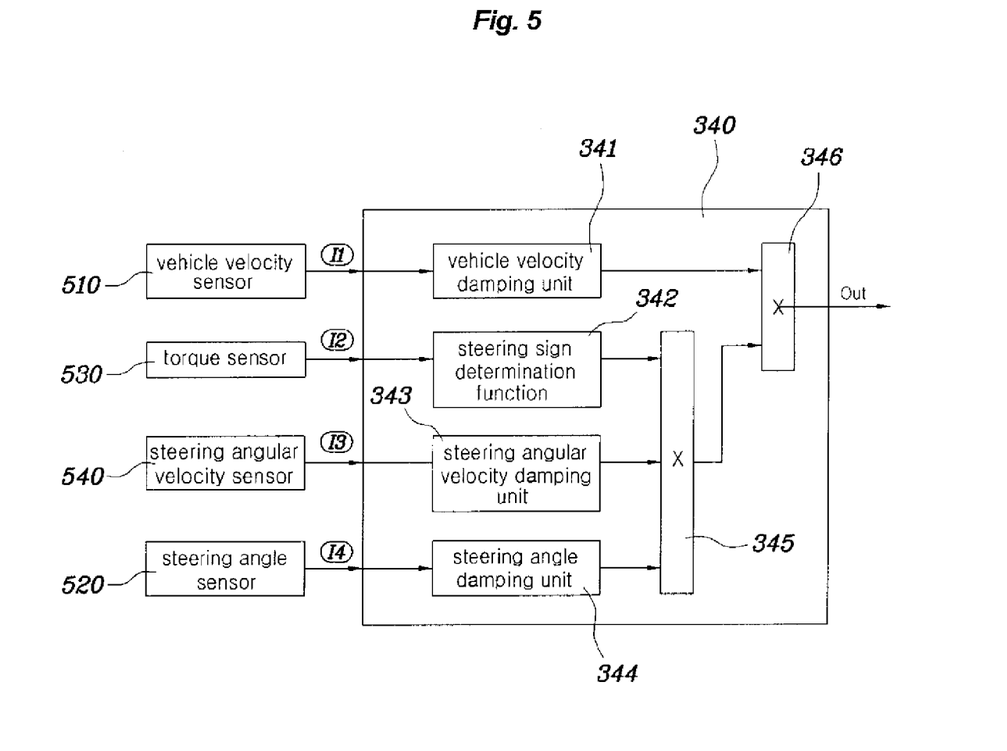
FIG. 5 is a block diagram showing the control logic of a damping force generation unit according to the present invention.

FIG. 5 shows the damping force generation unit 340 according to the present invention, which is the most characteristic technical element.

In order to more precisely control the damping force, the damping force generation unit 340 includes a vehicle velocity damping unit 341 for determining the magnitude of the damping force, which varies according to the vehicle velocity, from the vehicle velocity signal of the vehicle velocity sensor 510, a steering angular velocity damping unit 343 for determining the magnitude of the damping force, which varies according to the steering angular velocity, from the steering angular velocity signal of the steering angle velocity sensor 540, and a steering angle damping unit 344 for determining the magnitude of the damping force, which varies according to the steering angle, from the steering angle signal of the steering angle sensor 520.

In order to generate a steering feel similar to that of an actually used vehicle, the vehicle velocity damping unit 341 decreases the influence on damping by decreasing the damping force when the vehicle velocity is high (the steering reaction force may be increased through the generation of a negative damping force at a velocity equal to or greater than a predetermined velocity), but increases the influence on damping by increasing the damping force when the vehicle velocity is low. However, if the vehicle velocity is high but the damping force is too small, the driving stability of the vehicle is lowered. Accordingly, when the vehicle velocity is high, the yaw stability of the vehicle can be assured by increasing the damping force so that it is greater than that of an actually used vehicle.

The steering angular velocity damping unit 343 decreases the steering reaction force by increasing the damping force as the steering angular velocity increases, and thus prevents catch-up from occurring. However, in the case where a large damping force occurs at a very rapid steering angular velocity, the steering reaction force becomes weak, and thus the driving stability can be lowered. For this reason, damping and steering reaction force, which are similar to those of an actually used vehicle, are realized using Hardware-In-the-Loop Simulation (HILS).

The steering angle damping unit 344 increases the damping force in an on-center interval, so that motor drive torque decreases overall, therefore restraining overshoot. Furthermore, the steering angle damping unit 344 adjusts the restoration velocity for each steering angle when the steering angle is restored. When the steering angle increases, the steering angle damping unit 344 decreases the influence on damping so that a more rapid response can be acquired through the decrease of the damping force.

Meanwhile, the damping force generation unit 340 may further include a steering sign determination function 342 for determining a steering sign from the steering torque signal. The steering sign determination function 342 is used to distinguish handle steering and non-steering from each other using the torque sensor 530. If a damping force exists when the driver conducts steering, the motor drive torque value decreases, so that the steering reaction force decreases, therefore catch-up can be prevented. In contrast, when the driver does not conduct steering, the damping force decreases, and thus natural restoration performance can be assured. For this reason, the steering sign determination function 342 may be used to control the damping force.

The damping force generation unit 340 includes an operational logic 345 for combining the resulting values, determined by the steering sign determination function 342, the steering angular velocity damping unit 343 and the steering angle damping unit 344, and an operational logic 346 for combining the resulting value, determined by the operational logic 345, and the resulting value, determined by the vehicle velocity damping unit 341, and outputs the current control signal, which is applied to the steering feel generation motor 200, depending on the resulting value determined by the operational logic 346.

Accordingly, the damping force generation unit 340 of the present invention can output a damping force, which enables the generation of an optical steering feel, by combining values, determined by the steering sign determination function 342, the steering angular velocity damping unit 343 and the steering angle damping unit 344, using a value determined by the vehicle velocity damping unit 341.

Figure 6:
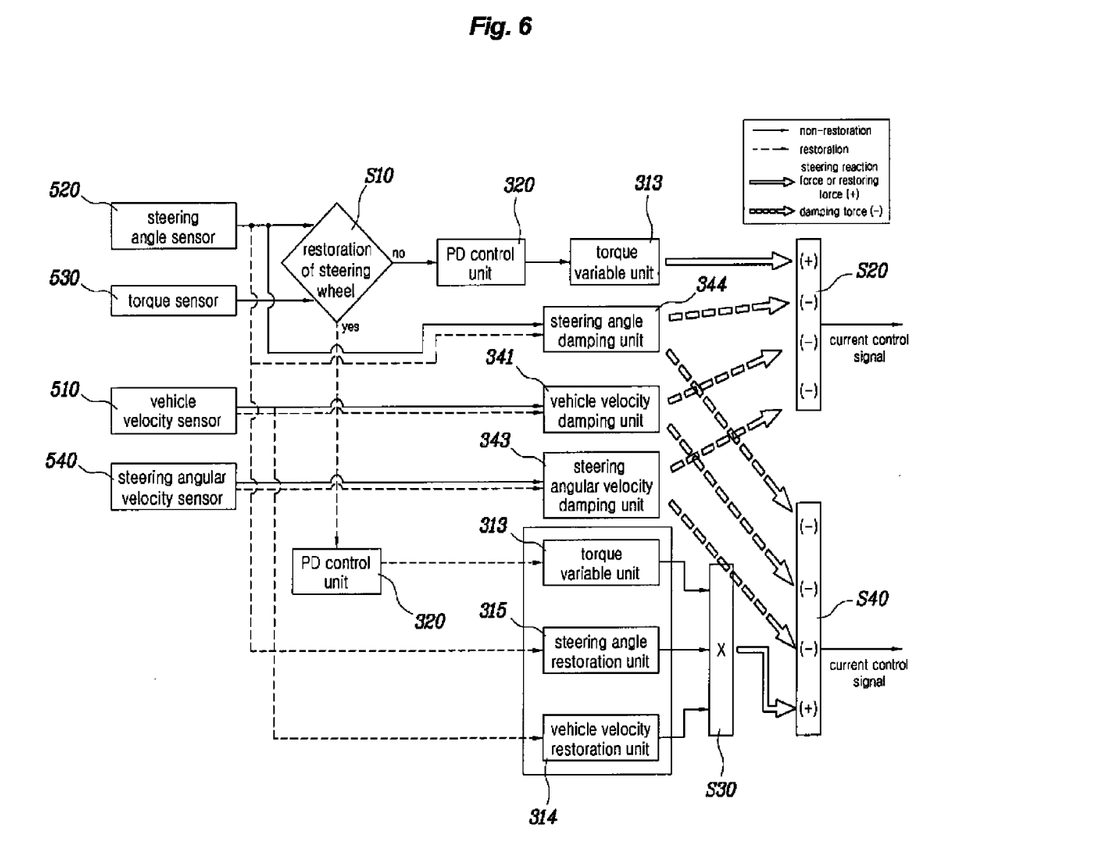
FIG. 6 is a diagram illustrating a method of controlling steering feel according to an embodiment of the present invention.

FIG. 6 is a schematic diagram illustrating an example of a control method using the steer-by-wire system of the present invention, which is constructed as described above.

First, the central control unit 300 determines whether the steering wheel is restored, from signals received from the steering angle sensor 520 at step S10. This determination may be made by the restoration determining function 316 of the reaction force generation unit 310. If, as a result of the determination of restoration, it is determined that the steering wheel has not been restored, the steering angle signal received from the steering angle sensor 520 is input to the PD control unit 320, and torque signal received from torque sensor 530 is input to the torque variable unit 313. The resulting value is determined by combination of the values of the torque variable unit 313 and the PD control unit 320, and therefore a (+) directional resulting value for the steering reaction force is determined.

Meanwhile, the vehicle velocity damping unit 341 determines the magnitude of the damping force, depending on variation in vehicle velocity, from the vehicle velocity signal received from the vehicle velocity sensor 510. The steering angular velocity damping unit 343 determines the magnitude of the damping force, depending on variation in steering angular velocity, from the steering angular velocity signal received from steering angular velocity sensor 540. Furthermore, the steering angle damping unit 344 determines the magnitude of the damping force, depending on variation in steering angle, from the steering angle signal received from steering angle sensor 520. Subsequently, the (−) directional resulting values, i.e. the combination of damping forces which are determined by the vehicle velocity damping unit 341, the steering angular velocity damping unit 343 and the steering angle damping unit 344, and the (+) directional resulting value, i.e, steering reaction force, which is determined by the torque variable unit 313 and PD control unit 320, are combined, and thus a final current control signal, which is applied to the rack motor, is output at step S20.

In contrast, if, as a result of the determination of restoration determination at step S10, it is determined that the steering wheel has been restored, the steering reaction force is determined by the torque variable unit 313 which determines the magnitude of the steering reaction force from the driver's steering torque signal received from the torque sensor 530 and the PD control unit 320 which determine the magnitude of the steering reaction force from the driver's steering angle signal received from the steering angle sensor 520. Further, the restoring force is determined by the vehicle velocity restoration unit 314 which determines the magnitude of the restoring force from the vehicle velocity signal received from the vehicle velocity sensor 510, and the steering angle restoration unit 315 which determines the magnitude of the restoring force from the steering angle signal received from the steering angle sensor 520. Subsequently, a (+) directional resulting value is determined through the combination of these steering reaction forces and the restoring force, at step S30.

Meanwhile, in the same manner as in the case of the non-restoration, the vehicle velocity damping unit 341, the steering angular velocity damping unit 343, the steering angle damping unit 344 respectively determine the magnitude of the damping force. Subsequently, the (−) directional resulting values of the damping forces determined by the vehicle velocity damping unit 341, the steering angular velocity damping unit 343 and the steering angle damping unit 344, and the (+) directional resulting value of steering reaction force and restoring, which is determined at step 30, are combined, and thus the final current control signal, which is applied to the rack motor, is output at step 40.

Figure 7:
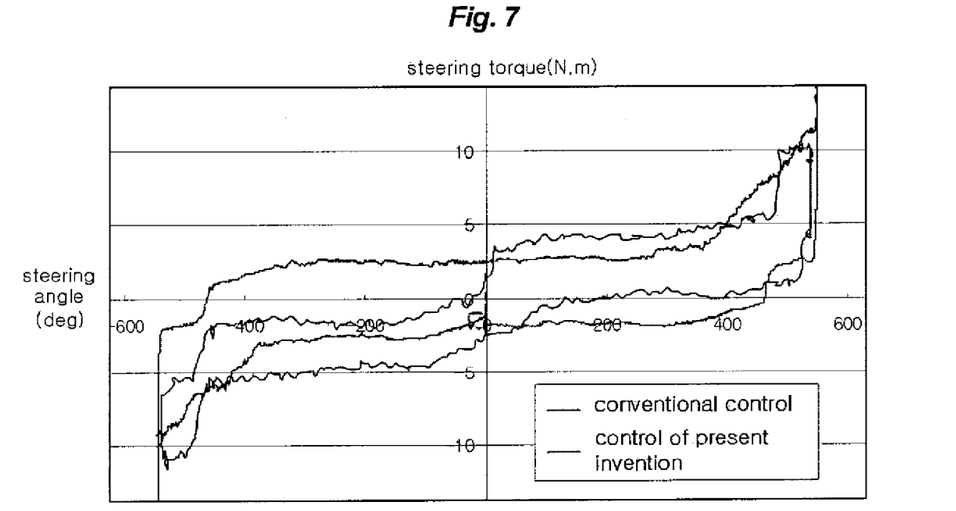
FIG. 7 is a graph showing the degree of improvement of steering feel according to the present invention.
Figure 8:
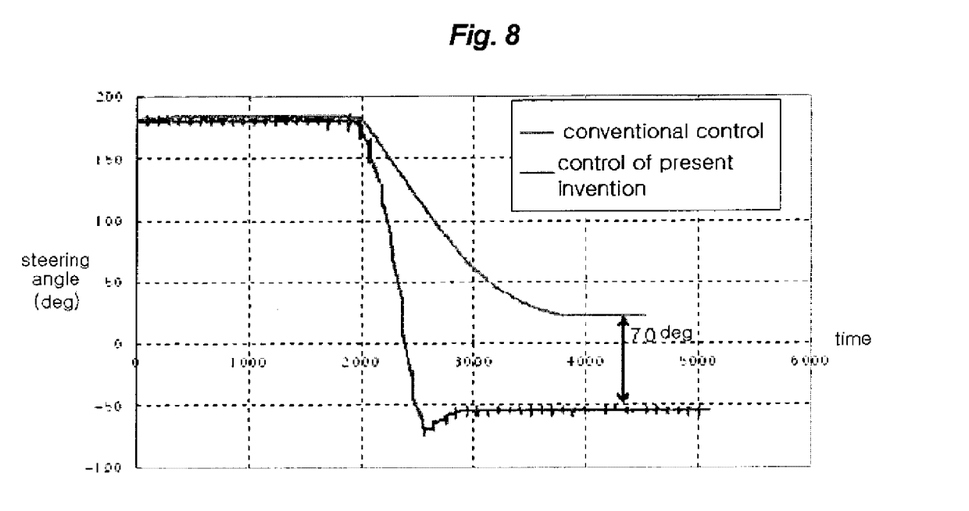
FIG. 8 is another graph showing the degree of improvement of steering feel according to the present invention.

FIGS. 7 and 8 are graphs showing experimental results determined using the control system of the present invention. As can be seen from FIG. 7, the conventional control system exhibits non-uniform steering torque as the steering angle of a steering wheel increases, whereas the control system of the present invention exhibits uniform steering torque even when the steering angle increases steering torque, thus providing a steering feel similar that of the actually used vehicle.

FIG. 8 shows experimental results determined when the degree of restoration is measured in the case where the steering wheel of a vehicle, moving at a constant velocity and a constant steering angle, is released. In the conventional control system, excessive restoring force occurs, and thus the steering angle is changed to a (−) directional steering angle (which means that overshoot has occurred). However, in the control system of the present invention, the steering angle is converted to be within the range of 20~30° in the (+) direction, and thus a steering feel similar to an actually used vehicle can be achieved.

Due to the above-described characteristic technical construction, the present invention not only allows a driver to experience the same steering feel as that of a vehicle in which a hydraulic power steering device is mounted, but also generates an optimal steering feel according to the driving velocity of a vehicle and the manipulation of the steering wheel, conducted by the driver, so that it can improve the driving stability of the vehicle.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the claims appended hereto and their equivalents.

What is claimed is:

1. A steer-by-wire system for automobiles, comprising:
a steering control unit comprising a steering wheel;
a steering feel generation motor mounted in the steering control unit;
a central control unit for outputting a steering control signal, and a current control signal, which is applied to the steering feel generation motor, according to motion of the steering wheel;
a steering mechanism unit comprising a rack motor for operating vehicle wheels in response to the steering control signal received from the central control unit; and
a signal input unit comprising a vehicle velocity sensor, a steering angle sensor, a torque sensor, and a steering angular velocity sensor, and used to input a sensing signal, which is necessary for the central control unit to control the steering feel generation motor;
wherein the central control unit receives a vehicle velocity signal, a steering angle signal, a steering torque signal and a steering angular velocity signal from the signal input unit, comprises a reaction force generation unit for generating steering reaction force or restoring force, acting in a reverse direction to that of a steering torque, and a damping force generation unit for generating damping force, acting in a reverse direction to the steering reaction force or the restoring force in an identical direction to the steering torque, and generates the current control signal, which is applied to the steering feel generation motor, by combining resulting values determined by the reaction force generation unit and the damping force generation unit.

2. The steer-by-wire system as set forth in claim 1, wherein the central control unit further comprises a Proportional-Derivative (PD) control unit for receiving the steering angle signal, performing a proportional-derivative operation on the received steering angle signal, and outputting a resulting value to the reaction force generation unit, in order to more precisely control the steering reaction force or the restoring force.

3. The steer-by-wire system as set forth in claim 1 or 2, wherein:

the central control unit further comprises a feedback signal unit for receiving feedback of a current value of the rack motor, performing operation on the current value along with the steering angular velocity signal, and outputting a resulting value, in order to control steering feel according to road conditions; and the central control unit outputs the current control signal, which is applied to the steering feel generation motor, through a combination of the resulting value, determined by the feedback signal unit, and the resulting values, determined by the reaction force generation unit and the damping force generation unit.

4. The steer-by-wire system as set forth in claim 1 or 2, wherein the reaction force generation unit further comprises a motor correction unit for determining a steering direction from the steering torque signal, determining a magnitude of the steering reaction force to correct a difference between frictional forces, attributable to left and right rotation of the rack motor, based on the steering direction, a vehicle velocity variable unit for determining a magnitude of the steering reaction force, which varies according to a vehicle velocity, from the vehicle velocity signal, and a torque variable unit for determining a magnitude of the steering reaction force, which varies according to steering, from the steering torque signal, in order to more precisely control the steering reaction force.

5. The steer-by-wire system as set forth in claim 4, wherein the central control unit outputs the current control signal, which is applied to the steering feel generation motor, through a combination of the resulting value, received from the PD control unit, and a resulting value, which is determined by the torque variable unit.

6. The steer-by-wire system as set forth in claim 1 or 2, wherein the reaction force generation unit further comprises a vehicle velocity restoration unit for determining a magnitude of the restoring force, which varies according to a vehicle velocity, from the vehicle velocity signal, and a steering angle restoration unit for determining a magnitude of the restoring force, which varies according to a steering angle, from the steering angle signal, in order to more precisely control the restoring force.

7. The steer-by-wire system as set forth in claim 1 or 2, wherein the reaction force generation unit further comprises a restoration determining function for determining whether the steering wheel is restored, from the steering angle signal.

8. The steer-by-wire system as set forth in claim 1 or 2, wherein the damping force generation unit further comprises a vehicle velocity damping unit for determining a magnitude of the damping force, which varies according to a vehicle velocity, from the vehicle velocity signal, a steering angular velocity damping unit for determining a magnitude of the damping force, which varies according to a steering angular velocity, from the steering angular velocity signal, and a steering angle damping unit for determining a magnitude of the damping force, which varies according to a steering angle, from the steering angle signal, in order to more precisely control the damping force.

9. The steer-by-wire system as set forth in claim 8, wherein the damping force generation unit further comprises a steering sign determination function for determining a steering sign from the steering torque signal.

10. The steer-by-wire system as set forth in claim 9, wherein the damping force generation unit combines resulting values, determined by the steering sign determination function, the steering angular velocity damping unit and the steering angle damping unit, and combines a resulting value, determined through a combination thereof, and a resulting value, determined by the vehicle velocity damping unit, thus outputting the current control signal which is applied to the steering feel generation motor.

* * * * *